(12) United States Patent
Vermeiden et al.

(10) Patent No.: US 8,261,154 B2
(45) Date of Patent: Sep. 4, 2012

(54) CONTINUOUS REDUNDANCY CHECK METHOD AND APPARATUS

(75) Inventors: Maarten Vermeiden, Rotterdam (NL); Albert Bredewoud, Wapenveld (NL); Arjan Breeschoten, Noord Brabant (NL); Wim J. Diepstraten, Noord Brabant (NL)

(73) Assignee: Motorola Mobility LLC, Libertyville, IL (US)

( * ) Notice: Subject to any disclaimer, the term of this patent is extended or adjusted under 35 U.S.C. 154(b) by 1102 days.

(21) Appl. No.: 11/938,547

(22) Filed: Nov. 12, 2007

(65) Prior Publication Data

US 2009/0125779 A1    May 14, 2009

(51) Int. Cl.
*H03M 13/00* (2006.01)
(52) U.S. Cl. ..................................... 714/758; 714/774
(58) Field of Classification Search .................. 714/758, 714/774
See application file for complete search history.

(56) References Cited

U.S. PATENT DOCUMENTS

| | | | |
|---|---|---|---|
| 3,336,467 A | 8/1967 | Frey, Jr. | |
| 5,691,997 A * | 11/1997 | Lackey, Jr. | ..................... 714/807 |
| 5,896,374 A | 4/1999 | Okumura et al. | |
| 6,212,660 B1 | 4/2001 | Joeressen et al. | |
| 6,856,628 B1 * | 2/2005 | Bychowsky et al. | ......... 370/412 |
| 7,185,266 B2 * | 2/2007 | Blightman et al. | ........... 714/776 |
| 7,729,322 B2 * | 6/2010 | Abrol et al. | ................... 370/338 |
| 2004/0158793 A1 * | 8/2004 | Blightman et al. | ........... 714/758 |
| 2005/0257117 A1 | 11/2005 | Chiang | |

FOREIGN PATENT DOCUMENTS

EP             0448074 A        9/1991

OTHER PUBLICATIONS

"Cyclic Redundancy Check", http://www.relisoft.com/Science/CrcMath.html, 3 pages, Oct. 8, 2007.
Patent Cooperation Treaty, "Notification of Transmittal of the International Search Report and the Written Opinion of the International Searching Authority" for International Application No. PCT/US2008/081020, Feb. 11, 2009, 16 pages.

* cited by examiner

*Primary Examiner* — M. Mujtaba K Chaudry
(74) *Attorney, Agent, or Firm* — Sylvia Chen

(57) ABSTRACT

A continuous redundancy check method and apparatus receives (110) at least one data bit of a block's payload, calculates (120) a partial redundancy check value using the at least one data bit, compares (130) the partial redundancy check value with a reference value, and stores (134, 138) in an index an indication of whether the calculated redundancy check value matched the reference value. Meanwhile, the at least one data bit is also stored (140) in a data memory. As additional data bits of the payload are received, cumulative partial redundancy check values are calculated and compared to the reference value. When the complete payload has been stored (140), the index is analyzed (160, 165) to determine if a block error has been detected by the redundancy check functions. This continuous redundancy check method and apparatus allows a receiver to quickly determine whether a block error has occurred, especially when there may be padding (or dummy) bits in the block's payload.

14 Claims, 3 Drawing Sheets

CONTINUOUS REDUNDANCY CHECK METHOD AND APPARATUS

FIELD OF THE DISCLOSURE

This disclosure relates generally to redundancy checking, and more particularly to verifying a redundancy check value when a received block's payload length is not known.

BACKGROUND OF THE DISCLOSURE

Traditionally, cyclic redundancy check (CRC) or checksum functions are implemented in hardware and used to detect corruption of data during wireless transmissions, which is often caused by noise in transmission channels. A receiver receives a transmission block having a header and a payload. Incoming data from the payload is fully stored in a memory, and the header is processed by a software module to obtain the length of the payload (e.g., in bits or bytes). The mathematical function of either CRC or checksum (whichever is specified according to the transmission scheme) is performed using the data stored in the memory to produce a calculated CRC or checksum value. This calculated value should result in a known, fixed reference value, provided that the data is correct. Alternatively, the reference value is given somewhere in the payload data. If the calculated value matches the expected result, it can be assumed the block is correct. Otherwise, the result is a conclusion of block error and the receiver can request re-transmission of the block, discard the block, or try to repair the block.

Because the traditional CRC or checksum verification can not performed until the block's data is completely stored in a memory and the length of the payload is determined, there is a certain amount of latency inherent in this process. In WiMAX systems (compliant with IEEE Standard 802.16e), this length uncertainty is exacerbated by the fact that there can be up to 29 padding bytes in the payload. Thus, (partial) parsing of the payload data to retrieve the length is needed before the traditional CRC or checksum verification can be performed by hardware. Thus, there is an opportunity to reduce this CRC or checksum verification latency. The various aspects, features and advantages of the disclosure will become more fully apparent to those having ordinary skill in the art upon careful consideration of the following Drawings and accompanying Detailed Description.

DETAILED DESCRIPTION

A continuous redundancy check method and apparatus receives at least one data bit of a block's payload, calculates a partial redundancy check value using the at least one data bit, compares the partial redundancy check value with a reference value, and stores in an index an indication of whether the calculated redundancy check value matched the reference value. As additional data bits of the payload are received, cumulative partial redundancy check values are calculated and compared to the reference value. By continuously calculating partial redundancy check values as data bits are received and storing indications of whether the partial redundancy check values match a reference value in an index, the results of multiple cumulative redundancy checks are already known by the time the complete payload has been stored. By using hardware to perform the partial redundancy check calculations and the comparisons, these functions can be performed very quickly.

When the complete payload has been stored, the index is analyzed to determine if a block error has been detected by the redundancy check functions. If the index shows that no partial redundancy check values match the reference value, then a block error is concluded. If the index shows that at least one partial redundancy check value matches the reference value, then the block can be fully processed. Alternately, the index can be analyzed for exactly one match. If there is exactly one match, then the block can be fully processed and the location of the match indicates the number of padding bits in the block's payload. This continuous redundancy check method and apparatus allows a receiver to quickly determine whether a block error has occurred, especially when where may be padding (or dummy) bits in the block's payload.

Figure 1:
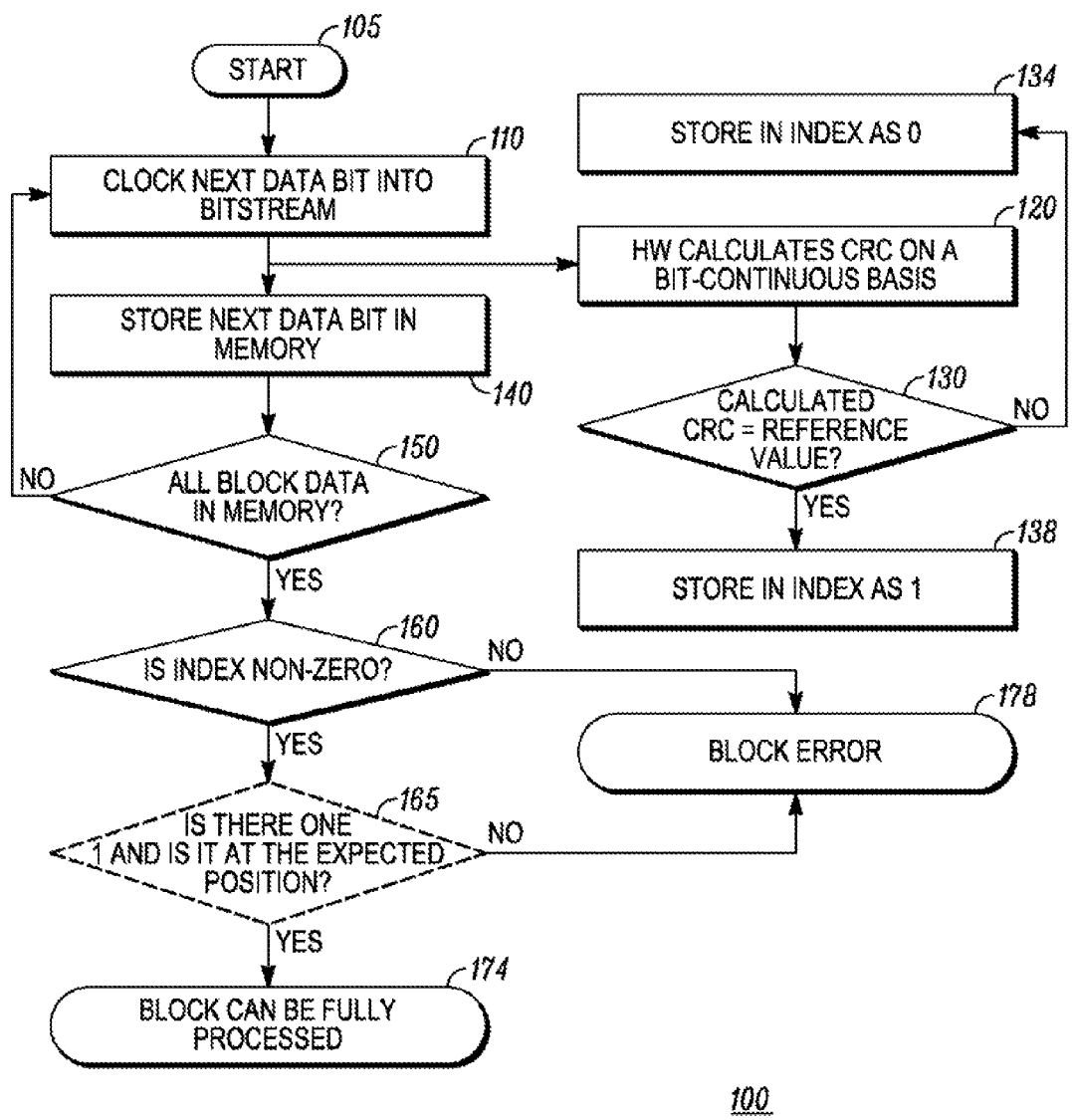
FIG. 1 shows a flowchart of a method for continuously calculating a cyclic redundancy check (CRC) value in accordance with an embodiment.

FIG. 1 shows a flowchart 100 of a method for continuously calculating a cyclic redundancy check (CRC) value in accordance with an embodiment. Although CRC is used in this example, another redundancy check function such as checksum may be substituted for CRC in other embodiments. This flowchart 100 can be implemented in hardware, software, or a combination of hardware and software.

At the start step 105, a receiver receives and demodulates a block having a header and a payload. Within the header is a received reference value; alternately the reference value is known beforehand. At step 110, the receiver clocks a data bit from the payload into a bit stream to CRC hardware. At step 120, the CRC hardware calculates a CRC value for the received data bits on a bit-continuous basis. So for the first data bit received, the CRC hardware calculates a first CRC value based on just one bit. In step 130, the hardware checks whether the just-calculated CRC value matches the reference value. If the two values do not match, step 134 shifts a 0 into the index vector. If the two values match, step 138 shifts a 1 in the index vector.

Meanwhile step 140 stores the data bit into a memory. Thus, the CRC value is being calculated at step 120 at the same time the bit is being stored into memory. In this flowchart 100, it is assumed that a CRC value is calculated every time that a bit is received and that a payload length can be any number of bits long (including 1 bit long or 0 bits long). Next, step 150 determines if all the data from the block's payload is in the memory. If less than all of the block's data has been stored, the flow returns to step 110 and the next data bit is clocked into the bitstream. As step 120 recurs a second time, the CRC hardware calculates a CRC value for the two bits it has received. If step 130 determines the calculated CRC value does not match the reference value, then step 134 places a 0 in a next location of the index vector. If the two values match, then step 138 places a 1 in the second location of the index vector. The storage step 140 and the checking for all block data step 150 continues as previously described until all the data from the block is in memory and a complete index vector has been built.

When step 150 determines that all the data from a block's payload has been stored in the memory per step 140, steps 160 and 165 analyze the index vector. To optimize processing, step 160 simply checks for a non-zero index vector. Recall that a 1 in the index vector means that the CRC function has detected a correct CRC value (at least for the length of the block data indicated by the position of the 1 in the index vector). There is a potential for more than one 1 in the index vector, so merely checking for a non-zero index vector slightly increases the chances for a false-positive detection but decreases processing and latency. Optional step 165 checks for precisely one instance of 1 in the index vector and can verify that the 1 is located in the correct position in the index vector. Because the actual length of the block is known at this time, step 165 can check that the 1 in the index vector corresponds to the known length. Or, the check in step 165 can be done in reverse: the location of the single 1 in the index vector (which location indicates the number of padding bits in the payload) can be verified against the header-indicated number of padding bytes (with eight bits to a byte). If step 165 is true, the payload can be assumed to be correct in the ending step 174.

If the index vector is all 0s, then the CRC function has detected no length for which the block data is correct, and step 178 concludes that there was a block error and the flow ends. Depending on the receiver implementation, a block with a detected error can be discarded, repaired, or requested for re-transmission.

By continuously calculating the CRC of the data bitstream as it is received, all the bit-continuous CRC values have been calculated by the time the data bits are stored in memory as performed by steps 140, 150. In previous redundancy checking methods, the CRC function was performed after the data bits had been completely stored in memory and the payload data was examined for the payload length. Thus, the latency of the continuous redundancy check is decreased because no CRC calculation is needed after the data bits are stored in memory and only the index vector needs to be analyzed in order to conclude that the data block can be processed further. In fact, a determination of payload length is not required in the embodiment shown, although payload length is used in optional step 165 to decrease the chances of false-positive detection.

An alternate implementation replaces the index vector with an index counter. For this alternate implementation, at step 105 the index counter is reset to 0 and at step 138 the index counter is set to 1. If the index counter is greater than 0, every subsequent occurrence of step 134 (as modified for this alternate implementation) increases the index counter value by one. Provided that the block data is uncorrupted, the index counter will hold the number of padding bits when the process reaches step 160. If the index counter is still 0 at step 160, then a block error is assumed. In step 165, which decreases the chances of a false-positive over step 160 alone, the index counter value can be checked against the header-indicated number of padding bytes (with eight bits to a byte) to determine whether the block should be fully processed in step 174 or judged to be a block error in step 178.

Figure 2:
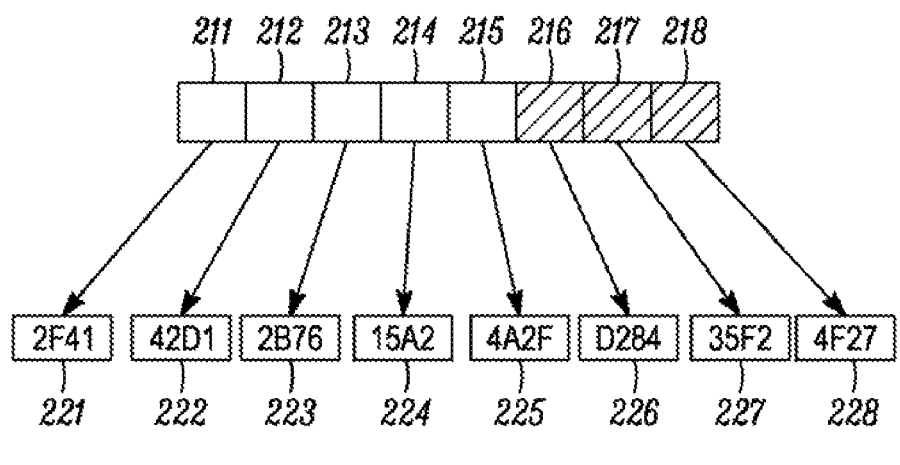
FIG. 2 shows an example of continuously calculated CRC values in accordance with an embodiment.
Figure 2:
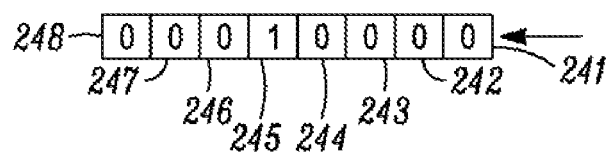

FIG. 2 shows an example 200 of continuously calculated CRC values 220 in accordance with an embodiment. For simplicity, we have assumed a payload length that can vary by only 1 byte. In other words, the payload may have up to 8 bits of padding. Thus, the CRC values are continuously calculated over only the last 8 bits of a block's payload—the potential padding bits. As assumed with FIG. 1 above, the CRC values can be calculated for every bit in the payload; however, diagramming an example of such an embodiment would be tedious.

As a first data bit 211 is received, CRC hardware calculates a first CRC value 221, which is shown here to be 2F41. The first calculated CRC value 221 is compared against the reference value 230 and found to be not equal to 4A2F. Thus, a 0 is shifted in the first element 241 of an eight-element index vector 240. When the second bit 212 is received, the CRC hardware calculates a second CRC value 222, which is shown to be 42D1 in this example. The second calculated CRC value 222 also does not match the reference value 230 and a 0 is shifted in the first element 241 of the index vector 240 thereby shifting the remainder of the index vector one place, e.g. previous element 241 is shifted to element 242, previous element 242 is shifted to element 243, etc. Note that a calculated CRC value overwrites each previously-calculated CRC value and only the indication of a match (or non-match) is cumulatively saved—in the index vector.

The process continues for third and fourth data bits 213, 214, which result in calculated CRC values 233, 234 of 2B76 and 15A2. Since neither of these values match the reference value 230, a 0 is shifted into the index vector 240.

The fifth bit 215 is sent to the CRC hardware, which returns a calculated CRC value 225 of 4A2F. For this bit, the calculated CRC value matches the reference value 230 and so a 1 is shifted into the index vector. Further bits 216, 217, 218 also return non-matching CRC values 226, 227, 228 and for these a 0 is shifted into the index vector 240.

At this point, all the payload data has been stored in memory and a processor can examine the index vector 240 to determine whether the CRC function has detected an error and, if no error is detected, the number of padding bits in the payload of the received block. Because the index vector 240 contains exactly one 1 (with all the other values being 0), the CRC function has not detected a block error. Because the 1 is located in the fifth element 245 of the index vector, the remaining bits (bits 6-8) are probably padding bits. The padding bits can be verified by parsing the payload data, if desired.

Although we have used bits in this example, it is possible to calculate CRC values every byte or word instead of every bit. Thus, this example shows how latency can be reduced when performing a redundancy check function, especially when a variable number of padding bits/bytes/words may occur in any given block. Additionally, CRC calculations and the comparisons of CRC values can be performed quickly in hardware, while the final examination of the index can be implemented in software. This is in contrast with traditional methods that use software to determine payload length and then hardware to perform the CRC calculations. By making the hardware portion independent of the software portion, the embodiments described here improve the speed at which redundancy checks can be performed.

Figure 3:
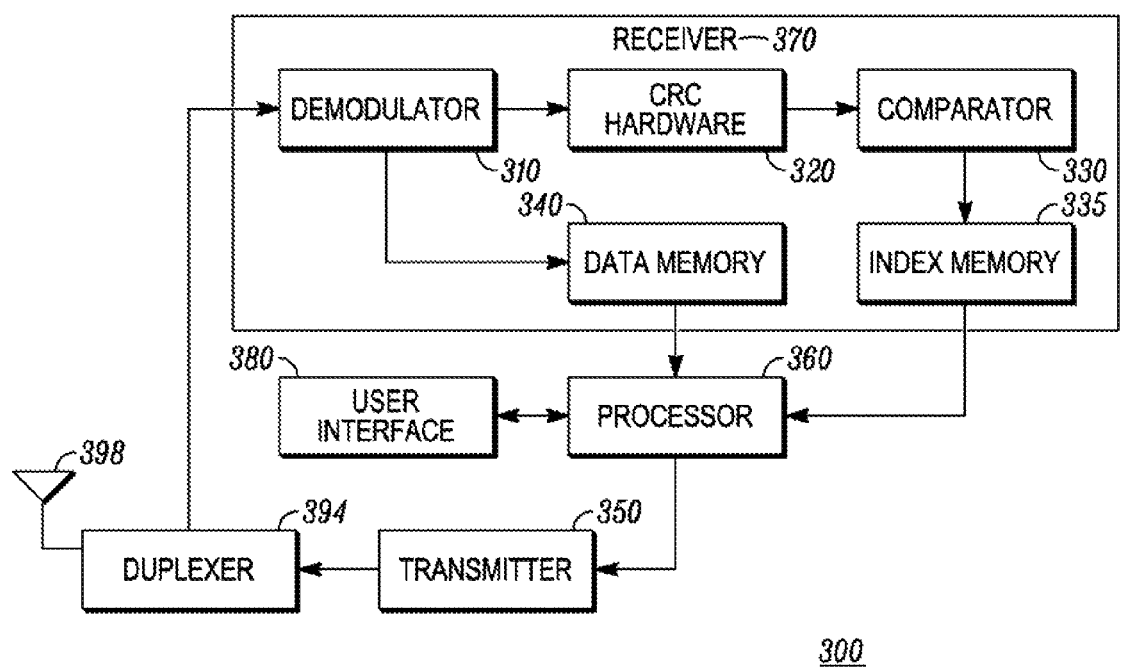
FIG. 3 shows a device for implementing the flowchart shown in FIG. 1 in accordance with an embodiment.

FIG. 3 shows a communication device 300 for implementing the flowchart shown in FIG. 1 in accordance with an embodiment. In this embodiment, it is assumed that the CRC calculations and value comparisons will be performed using hardware while the examination of the complete index vector will be performed using software. Of course, hardware and software can be used differently to implement the flowchart depending on the desired speed of the completion of a redundancy check, the length of data payload, and the potential variation in the payload length. Although the device is shown as being wireless, the flowchart shown in FIG. 1 can also be implemented in wired communication devices.

The communication device 300 includes an antenna 398, a duplexer 394, a transmitter 350, and a receiver 370. The device 300 also includes a user interface 380, a processor 360, and memory 335, 340. Many other components that are generally part of communication devices have been omitted for the sake of simplicity. The antenna 398, duplexer 394, transmitter 350, and user interface 380 operate conventionally. The receiver 370 and processor 360 are designed to implement the flowchart shown in FIG. 1.

Within the receiver 370, a demodulator 310 demodulates the signals received by the antenna 398 and routed by the duplexer 394. CRC hardware 320 (such as receiver logic that can be implemented in an application-specific integrated circuit) receives the demodulated bits (or bytes or words) and calculates a cyclic redundancy check value (or uses other redundancy check function) on a bit-continuous basis as described previously with reference to FIG. 1 and FIG. 2.

A comparator 330 checks whether each calculated CRC value matches a reference value. The reference value can be received in a header or known beforehand. If the calculated CRC value matches the reference value, a 1 is put in the index memory 335. If the calculated CRC value does not match the reference value, a 0 is put in the index memory 335. As mentioned previously, the index memory can be implemented in the form of an index vector or an index counter.

Meanwhile, the data memory 340 also receives the demodulated data bits and stores them. When all the data from a block's payload has been stored in the data memory 340, the processor 360 analyzes the index memory 335 to determine whether the block can be fully processed or whether there was a block error. As described previously with reference to FIG. 1, the analysis can be simply a check for whether the index is non-zero, or it can be more complicated and check for the occurrence of exactly one 1 and verify that the location of the 1 matches with the number of padding bits indicated in the block header.

If the processor 360 determines that the block can be fully processed, the receiver 370 processes the received block in accordance with known methods. If the processor 360 determines a block error, the transmitter 350 can be used to request re-transmission of the block; or the receiver 370 can discard the block or attempt to repair the block in accordance with known methods.

Thus, a continuous redundancy check allows a receiver to quickly determine whether a block error has occurred especially when there may be padding (or dummy) bits in the block's payload. By performing redundancy calculations simultaneously with storing a bit in memory, the result of multiple redundancy checks are already known by the time the complete payload has been stored. By reducing the block error determination to a simple examination of whether the index is non-zero (indicating that, at least for a particular length, the calculated redundancy check value matches the reference value), the latency of a redundancy check is further improved. If no block error is found, the location of the 1 in the index vector indicates the number of padding bits in a block's payload.

While this disclosure includes what are considered presently to be the embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, processor 360 includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A continuous redundancy check method comprising:
 receiving a first data bit from a payload;
 calculating a partial redundancy check value using the first data bit to provide a first partial redundancy check value;
 comparing the first partial redundancy check value with a reference value; and
 storing a first indication of whether the first partial redundancy check value matched the reference value;
 receiving a last data bit from the payload;
 calculating a last redundancy check value using at least the first data bit and the last data bit;
 comparing the last redundancy check value with the reference value;
 storing a last indication of whether the last redundancy check value matched the reference value;
 analyzing the stored indications; and
 determining a number of padding bits based on analyzing the stored indications.

2. A continuous redundancy check method according to claim 1 further comprising:
 storing the first data bit in a memory after the receiving a first data bit from a payload.

3. A continuous redundancy check method according to claim 1 further comprising:
 storing the last data bit in a memory after the receiving a last data bit from the payload.

4. A continuous redundancy check method according to claim 1 wherein analyzing the stored indications comprises:
 concluding an error in received data bits if there are no indications of a match.

5. A continuous redundancy check method according to claim 4 further comprising:
 concluding no error in the received data bits if there is at least one indication of a match.

6. A continuous redundancy check method according to claim 4 further comprising:

concluding no error in received data bits if there is exactly one indication of a match.

7. A continuous redundancy check method according to claim 6 further comprising:
   determining the number of padding bits based on a location of the exactly one indication of a match.

8. A continuous redundancy check method according to claim 1 further comprising:
   determining that all data bits from the payload have been received.

9. A communication device comprising:
   a receiver for receiving electromagnetic signals having:
      a demodulator for demodulating the electromagnetic signals into blocks with a header and a payload;
      redundancy check hardware, coupled to the demodulator, for receiving bits from the demodulator and calculating partial redundancy check values for the payload;
      a comparator, coupled to the redundancy check hardware, for comparing the partial redundancy check values with a reference value;
      an index memory, coupled to the comparator, for storing indications of whether the partial redundancy check values matched the reference value; and
      a processor, coupled to the index memory, for determining a number of padding bits based on analyzing the stored indications.

10. A communication device in accordance with claim 9 wherein the index memory is an index vector.

11. A communication device in accordance with claim 9 wherein the index memory is an index counter.

12. A communication device according to claim 9 wherein the processor concludes
    a block error if no partial redundancy check value matched the reference value.

13. A communication device according to claim 12 wherein the processor concludes no block error if at least one partial redundancy check value matched the reference value.

14. A communication device according to claim 12 wherein the processor concludes no block error if exactly one partial redundancy check value matched the reference value.

* * * * *